United States Patent [19]
Burwell

[11] 4,159,184
[45] Jun. 26, 1979

[54] FRIABLE THREAD ELECTRODE JOINT

[75] Inventor: William H. Burwell, Olmsted Falls, Ohio

[73] Assignee: Union Carbide Corporation, New York, N.Y.

[21] Appl. No.: 898,191

[22] Filed: Apr. 24, 1978

Related U.S. Application Data

[63] Continuation-in-part of Ser. No. 804,222, Jun. 7, 1977, abandoned.

[51] Int. Cl.² ............................ F16D 9/00; F16P 5/00; F16B 7/18; H05B 7/06
[52] U.S. Cl. ...................................... 403/2; 403/296; 13/18 C
[58] Field of Search ................. 403/DIG. 5, 296, 343, 403/2, 305; 13/18

[56] References Cited

U.S. PATENT DOCUMENTS

| | | | |
|---|---|---|---|
| 2,957,716 | 10/1960 | Kaufmann et al. | 403/DIG. 5 |
| 2,970,854 | 2/1961 | Johnson | 403/DIG. 5 |
| 3,048,434 | 8/1962 | Johnson et al. | 403/DIG. 5 |
| 3,088,762 | 5/1963 | Kaufmann et al. | 403/296 |
| 3,134,616 | 5/1964 | Kaufmann | 403/DIG. 5 |
| 3,550,270 | 12/1970 | Watson et al. | 403/296 |
| 3,612,586 | 10/1971 | Stieber | 403/296 |

Primary Examiner—Wayne L. Shedd
Attorney, Agent, or Firm—J. Hart Evans

[57] ABSTRACT

An electrode joint having tapered threaded recesses in the mating electrode sections and a connecting threaded nipple, with a friable thread segment either in each threaded recess, or on each half of the threaded nipple, the friable thread being thickened along at least a portion of its long flank and being reduced in thickness along its short flank.

24 Claims, 4 Drawing Figures

FRIABLE THREAD ELECTRODE JOINT

RELATED APPLICATION

This application is a continuation-in-part of my co-pending application, Ser. No. 804,222 filed June 7, 1977, and now abandoned.

This invention relates to electrode joints and more particularly it relates to an electrode joint construction which accomodates thermal expansion of the joint. Graphite electrodes, such as those used in electric furnaces and like equipment, are consumed in use and must be continuously fed into the furnace or other equipment where they are used. In order to facilitate this continuous feed, the electrode sections are suitably bored and threaded at each end to provide juncture means through a nipple. In this manner, a new electrode is joined to the one being consumed by inserting a nipple into the bore of either the new or consumed electrode and joining the composite electrode-nipple to the other electrode section. While nipples and their corresponding bore holes may have threaded sides which are parallel to the nipple axis, it has been found advantageous to taper the nipple so that the largest diameter is at the point of contact between the electrode sections. The nipple is screwed into place with the small diameter end going furthest into the electrode body. In threading the tapered nipples for use in joining electrode sections, the thread depth is the same whether measured at the small diameter ends or at the larger diameter center, and generally a line perpendicular to the center axis of the nipple would bisect the thread included angle. By virtue of the joint's taper it is usual that each thread consists of a long flank and an opposite short flank. The loaded or short flank carries most, if not all, of the stress between the nipple and the electrode sections.

It has long been recognized that it is desirable to provide sufficient clearance between the long flank of the threads on the nipple and those in the electrode socket in order to reduce the thermal stress which inevitably accompanies use of the electrode. Various remedies and solutions have been proposed to insure this thread clearance. For example, U.S. Pat. No. 2,970,854 teaches a fugitive shim applied to the long flank of a thread on the nipple. Such a shim positions the nipple when it is screwed into the socket so as to provide uniform clearance between the idle flanks of the nipple threads and the electrode threads. The shim is made of a fugitive material such as copper which melts and flows when the electrode is heated, thus permitting expansion of the shimmed thread along with the others.

While the shimmed thread of U.S. Pat. No. 2,970,854 works very well it is relatively expensive to use and a less expensive alternative has long been sought. We have now discovered a new and different method of positioning the nipple as it is screwed into the socket so as to provide uniform clearance between the threads to allow for thermal expansion.

According to one embodiment of my invention a particular thread or threads on the electrode end socket into which the nipple is screwed first is thickened along at least a portion of its long flank and reduced in thickness along the short flank of the same thread. In a second embodiment of my invention a particular thread or threads on the nipple are thickened along the long flank and reduced in thickness along the short flank of the same thread. In both cases the increased thickness along the long flank serves the same purpose as a shim, operating to stop the advance of the nipple into the electrode socket and preserve the desired spacing between the other long flanks of the nipple threads and electrode socket threads. The reduction in thickness serves to make the socket or nipple thread friable. As thermal stress builds up in the joint the friable thread ruptures. The reduced thickness along the short flank not only encourages rupture of this sacrificial thread but provides a space for the broken off thread portion to move into. The long flanks of this nipple and the corresponding or mating long flanks of the electrode socket thus move closer together as a result of thermal expansion thereby making the fit between the two somewhat yieldable in order to compensate for uneven dimension variation due to heating while in service. This means that expansion which accompanies heating of the electrode while in use will cause substantially less stress between the nipple and the electrode section which may otherwise result in cracking or fracture of either the nipple or the section or both. As the electrode joint is heated, the friable thread will rupture and move into the clearance provided for it, thus allowing more room for the threads to expand. This clearance is essential to the invention and unless it is provided the broken pieces of thread will have no place to move to and the thermal stresses will be transmitted through the thickened thread and the nipple. The stress required to cause rupture of the frangible thread is well below that which would otherwise damage the socket or nipple. In the drawing:

Figure 1:
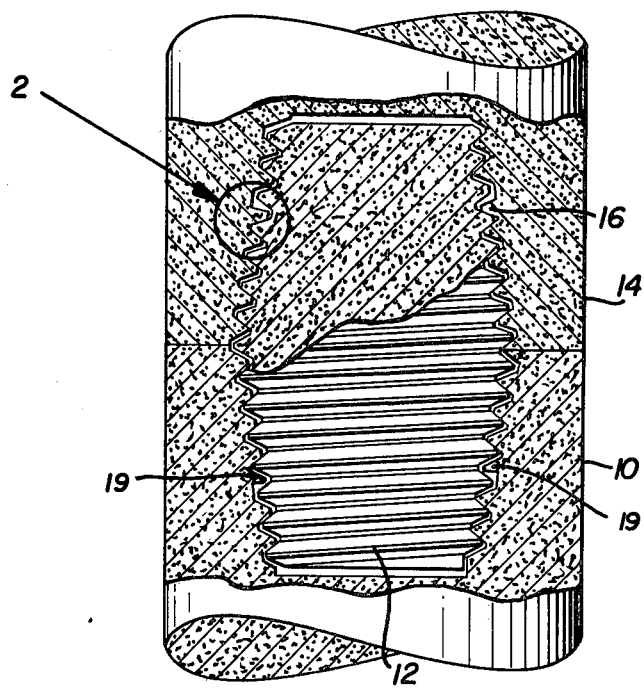
FIG. 1 is a sectional elevation of an electrode joint showing the ends of two electrodes having friable socket threads joined by a nipple.
Figure 2:
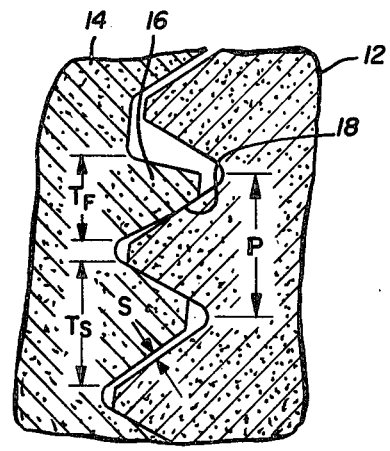
FIG. 2 is a detail section view from FIG. 1.
Figure 3:
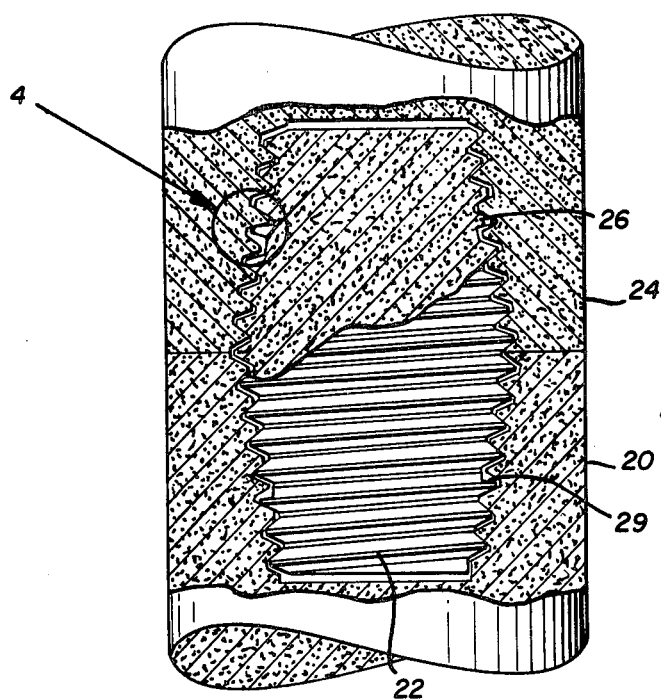
FIG. 3 is a sectional elevation of an electrode joint showing the ends of two electrodes joined by a nipple having friable threads.
Figure 4:
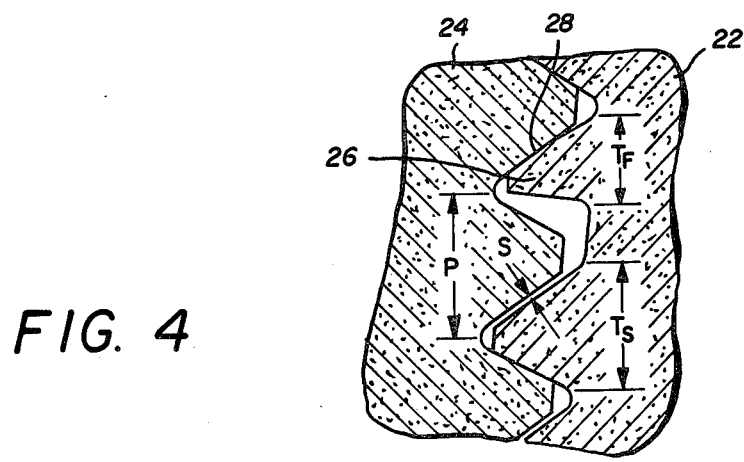
FIG. 4 is a detail section view from FIG. 3.

More particularly and with reference to the accompanying drawing, a joint incorporating one embodiment of this invention is composed of an upper electrode section 14 with a nipple 12 seated therein and connected to the lower electrode section 10. At least one friable thread 16 on the upper electrode section 14 is provided with a thickened long flank 18 to distribute the clearance between socket thread and nipple thread thereby allowing room for the thermal expansion of the nipple within the socket. A similar friable thread 19 is preferably though not necessarily present in the mating socket of the lower electrode section 10 because the electrode sections are manufactured with sockets on both ends which are interchangeable when the electrode is assembled at a joint. The friable thread 19 in the mating socket of the lower electrode section 10 is not normally fractured however because the design and construction of the joint is such that the nipple 12, being screwed into the first or upper electrode section 14 first, penetrates more deeply into the first section 14 than into the second or lower electrode section 10 when the joint is screwed together, penetration of nipple 12 into section 10 being stopped by contact of the end faces. Thus the nipple threads do not jam socket threads in the lower electrode section when the joint is assembled and there is no need for a thickened friable thread to prevent jamming of the standard threads.

A joint incorporating a second embodiment of the invention is composed of an upper electrode section 24 with a nipple 22 seated therein and connected to the lower electrode section 20. At least one friable thread 26 on the upper half of the nipple 22 mating with upper electrode section 24 is provided with a thickened long flank 28 to distribute the clearance between socket thread and nipple thread thereby allowing room for thermal expansion of the nipple within the socket. A similar friable thread 29 is preferably though not necessarily present in the lower half of nipple 22 mating with the lower electrode section 20 because the nipples are preferably manufactured with identical ends which are interchangeable when the electrode joint is assembled. The friable thread 29 on the nipple half mating with the lower electrode section 20 is not normally fractured however because the design and construction of the joint is such that the nipple 22, being screwed into the first or upper electrode section 24 first, penetrates more deeply into the first section 24 than the second or lower electrode section 20 when the joint is screwed together, penetration of the nipple 22 into the lower section 20 being stopped by contact of the end faces. Thus the nipple threads do not jam socket threads in the lower electrode section when the joint is assembled and there is no need for a thickened friable thread to prevent jamming of the standard threads.

At least one friable thread or full revolution of thread on each electrode socket or nipple half and up to two threads or complete revolutions of thread is preferred. More than two threads is unnecessary and tends to weaken the overall joint to an unacceptable degree.

Although the friable thread can be located anywhere along the length of the threaded electrode socket or nipple, the preferred location in the case of a threaded socket is in the middle 50 percent of the threaded depth between the electrode end face and the base or bottom of the socket or recess in the electrode. When the friable thread is on the nipple rather than on the electrode socket the preferred location is in the middle 50 percent of the threaded portion of the nipple between its end and its maximum diameter plane. The preferred thickness of the thread in the friable thread segment designated $T_F$ on the drawing, is between 50 and 75 percent of the thickness of the standard thread, shown as $T_S$.

In an electrode joint construction according to the invention the clearance designated S on the drawing between the thread long flanks of the threaded nipple and the mating standard thread long flanks of the threaded electrode sections is preferably between about 0.005 and 0.020 inches. In such a joint according to the invention the space between the friable thread short flank and the mating thread short flank is between 1 percent and 25 percent of the thread pitch.

An electrode joint according to the invention can be made with a friable thread on either the nipple or the socket. If desired a friable thread can be used on both the nipple and the socket, however this gives no added advantage in most cases and a friable thread on either one is ordinarily sufficient.

What is claimed is:

1. A tapered electrode joint comprising two electrode sections having tapered threaded sockets in the ends thereof and a tapered threaded nipple connecting said sections, a friable segment of the thread in at least one of:
   (a) at least one of said threaded electrode sockets, the socket into which said nipple is screwed first, before a second electrode is screwed onto said nipple, and
   (b) at least one end of said nipple, the end which is first screwed into an electrode socket, before a second electrode is screwed onto said nipple, said friable segment of thread being thickened along at least a portion of its long flank and being reduced in thickness along its short flank, said long flank of said friable segment when in contact with the mating thread long flank of the other component of said joint providing a substantially uniform clearance between the standard thread long flanks of said threaded nipple and the mating standard thread long flanks of said threaded electrode sections, and thereby providing room for thermal expansion of said electrode joint, said reduced thickness along said short flanks providing a relief space between said short flanks of said friable segment and the mating thread short flanks of said other component, thereby permitting said friable thread portion to rupture under thermal expansion of said joint without engendering excessive thermal stress in the remaining areas of contact of the threads of said electrode sections and said nipple.

2. A tapered electrode joint comprising two electrode sections having tapered threaded sockets in the ends thereof and a tapered threaded nipple connecting said sections, a friable segment of the thread in at least one of said ends, the end into which said nipple is screwed first, before a second electrode section is screwed onto said nipple, being thickened along at least a portion of its long flank and being reduced in thickness along its short flank, said long flank of said friable segment when in contact with the mating thread long flank of said nipple providing a substantially uniform clearance between the standard thread long flanks of said threaded nipple and the mating standard thread long flanks of said threaded electrode sections, and thereby providing room for thermal expansion of said electrode joint, said reduced thickness along said short flanks providing a relief space between said short flanks of said friable segment and the mating thread short flanks of said tapered threaded nipple, thereby permitting said friable thread portion to rupture under thermal expansion of said joint without engendering excessive thermal stress in the remaining areas of contact of the threads of said electrode sections and said nipple.

3. A tapered electrode joint according to claim 2 wherein said friable thread segment is in the middle 50 percent of the threaded depth between the electrode end face and the base of the socket in said electrode.

4. A tapered electrode joint comprising two electrode sections having tapered threaded sockets in the ends thereof and a tapered threaded nipple connecting said sections, a friable segment of a thread in at least one end of said nipple, the end which is first screwed into a socket before a second electrode section is screwed onto said nipple, being thickened along at least a portion of its long flank and being reduced in thickness along its short flank, said long flank of said friable segment when in contact with the mating thread long flank of said socket providing a substantially uniform clearance between the standard thread long flanks of said threaded nipple and the mating standard thread long flanks of said threaded electrode sections, and thereby providing room for thermal expansion of said electrode joint, said reduced thickness along said short flank providing a relief space between said short flank of said friable segment and the mating thread short flank of said tapered threaded socket, thereby permitting said friable thread portion to rupture under thermal expansion of said joint without engendering excessive thermal stress in the remaining areas of contact of the threads of said electrode sections and said nipple.

5. A tapered electrode joint according to claim 4 wherein said friable thread segment is in the middle 50 percent of threaded nipple half between the nipple end and its maximum diameter plane.

6. A tapered electrode joint according to claim 1, 2 or 4 wherein said friable segment of thread consists of at least one revolution of the thread.

7. A tapered electrode joint according to claim 1, 2 or 4 wherein said friable segment of thread consists of at least two revolutions of the thread.

8. A tapered electrode joint according to claim 1, 2 or 4 wherein the thickness of the thread in the friable thread segment is between 50 percent and 75 percent of the thickness of the standard thread.

9. A tapered electrode joint according to claim 1, 2 or 4 wherein said clearance between said thread long flanks of said threaded nipple and said mating standard thread long flanks of said threaded electrode section sockets is between 0.005 and 0.020 inches.

10. A tapered electrode joint according to claim 1, 2 or 4 wherein said space between said friable thread short flank and said mating thread short flank is between 1 percent and 25 percent of the thread pitch.

11. An electrode section having a tapered threaded socket in at least one end, said end being adapted to receive the insertion of a threaded nipple, and with said nipple and a second electrode section screwed onto said nipple after said insertion, to form a tapered electrode joint, said threaded socket in said end having a friable segment of thread, said friable segment being thickened along at least a portion of its long flank and being reduced in thickness along its short flank, said long flank of said friable segment when in contact with the mating thread long flank of said nipple providing a substantially uniform clearance between the thread long flanks of said threaded nipple and the mating standard thread long flank of said threaded electrode socket sections, and thereby providing room for thermal expansion of said electrode joint, said reduced thickness along said short flank providing a relief space between said short flank of said friable segment and the mating thread short flank of said tapered threaded nipple, thereby permitting said friable thread portion to rupture under thermal expansion of said joint without engendering excessive thermal stress in the remaining areas of contact of the threads of said electrode sections and said nipple.

12. An electrode section according to claim 11 wherein said friable segment of thread consists of at least one revolution of the thread.

13. An electrode section according to claim 11 wherein said friable segment of thread consists of at least two revolutions of the thread.

14. An electrode section according to claim 11 wherein said friable thread segment is in the middle 50 percent of the threaded depth between the electrode end face and the base of the socket in said electrode.

15. An electrode section according to claim 11 wherein the thickness of the thread in the friable thread segment is between 50 percent and 75 percent of the thickness of the standard thread of said electrode socket.

16. An electrode section according to claim 11 wherein said clearance between said thread long flanks of said threaded nipple and said mating standard thread long flanks of said threaded electrode sections is between 0.005 and 0.020 inches.

17. An electrode section according to claim 11 wherein said space between said friable thread short flank and said mating thread short flank of said threaded nipple is between 1 percent and 25 percent of the thread pitch.

18. An electrode nipple having tapered threaded ends, adapted to be screwed into an electrode end socket and then to have a second electrode end socket screwed onto the exposed end of said nipple, a friable segment of the thread on at least one end of said nipple, the end which is first screwed into a socket before being screwed together with a second electrode section to form an electrode joint, being thickened along at least a portion of its long flank and being reduced in thickness along its short flank, said long flank of said friable segment when in contact with the mating thread long flank of said socket providing a substantially uniform clearance between the standard thread long flanks of said threaded nipple and the mating thread long flanks of said threaded electrode sections, and thereby providing room for thermal expansion of said electrode joint, said reduced thickness along said short flanks providing a relief space between said short flank of said friable segment and the mating thread short flank of said tapered threaded socket, thereby permitting said friable thread portion to rupture under thermal expansion of said joint without engendering excessive thermal stress in the remaining areas of contact of the threads of said electrode sections and said nipple.

19. An electrode nipple according to claim 18 wherein said friable thread segment is in the middle 50 percent of the threaded nipple half between the nipple end and its maximum diameter plane.

20. An electrode nipple according to claim 18 wherein said friable segment of thread consists of at least one revolution of the thread.

21. An electrode nipple according to claim 18 wherein said friable segment of thread consists of at least two revolutions of the thread.

22. An electrode nipple according to claim 18 wherein the thickness of the thread in the friable thread segment is between 50 percent and 75 percent of the thickness of the standard thread.

23. An electrode nipple according to claim 18 wherein said clearance between said standard thread long flanks of said threaded nipple and said mating standard thread long flanks of said threaded electrode section sockets is between 0.005 and 0.020 inches.

24. An electrode nipple according to claim 18 wherein said space between said friable thread short flank and said mating thread short flank is between 1 percent and 25 percent of the thread pitch.

* * * * *